US006944785B2

(12) United States Patent
Gadir et al.

(10) Patent No.: US 6,944,785 B2
(45) Date of Patent: Sep. 13, 2005

(54) HIGH-AVAILABILITY CLUSTER VIRTUAL SERVER SYSTEM

(75) Inventors: Omar M. A. Gadir, Sunnyvale, CA (US); Kartik Subbanna, Sunnyvale, CA (US); Ananda R. Vayyala, Cupertino, CA (US); Hariprasad Shanmugam, Santa Clara, CA (US); Amod P. Bodas, Santa Clara, CA (US); Tarun Kumar Tripathy, Fremont, CA (US); Ravi S. Indurkar, San Jose, CA (US); Kurma H. Rao, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 586 days.

(21) Appl. No.: 09/911,902

(22) Filed: Jul. 23, 2001

(65) Prior Publication Data
US 2003/0018927 A1 Jan. 23, 2003

(51) Int. Cl.[7] .............................................. G06F 11/00
(52) U.S. Cl. ............................................................ 714/4
(58) Field of Search .............................. 714/4, 43, 15; 709/229, 223

(56) References Cited

U.S. PATENT DOCUMENTS

| 5,113,519 A | 5/1992 | Johnson et al. |
| 5,163,131 A | 11/1992 | Row et al. |
| 5,355,453 A | 10/1994 | Row et al. |
| 5,432,907 A | 7/1995 | Picazo, Jr. et al. |
| 5,485,579 A | 1/1996 | Hitz et al. |
| 5,513,314 A * | 4/1996 | Kandasamy et al. ........... 714/6 |
| 5,592,611 A | 1/1997 | Midgely et al. |
| 5,802,366 A | 9/1998 | Row et al. |
| 5,819,292 A | 10/1998 | Hitz et al. |
| 5,835,720 A | 11/1998 | Nelson et al. |
| 5,931,918 A | 8/1999 | Row et al. |

(Continued)

OTHER PUBLICATIONS

Hitz, D. et al., "File System Design for an NFS File Server Appliance" [TR3002], Jul. 9, 2001, pp. 1–10, http://www.n-etapp.com/tech_library/3002.print.

(Continued)

Primary Examiner—Robert Beausoliel
Assistant Examiner—Marc M. Duncan
(74) Attorney, Agent, or Firm—Fish & Richardson P.C.

(57) ABSTRACT

Systems and methods, including computer program products, providing high-availability in server systems. In one implementation, a server system is cluster of two or more autonomous server nodes, each running one or more virtual servers. When a node fails, its virtual servers are migrated to one or more other nodes. Connectivity between nodes and clients is based on virtual IP addresses, where each virtual server has one or more virtual IP addresses. Virtual servers can be assigned failover priorities, and, in failover, higher priority virtual servers can be migrated before lower priority ones. Load balancing can be provided by distributing virtual servers from a failed node to multiple different nodes. When a port within a node fails, the node can reassign virtual IP addresses from the failed port to other ports on the node until no good ports remain and only then migrate virtual servers to another node or nodes.

39 Claims, 7 Drawing Sheets

U.S. PATENT DOCUMENTS

| | | | |
|---|---|---|---|
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,006,259 A | 12/1999 | Adelman et al. | |
| 6,038,570 A | 3/2000 | Hitz et al. | |
| 6,065,037 A | 5/2000 | Hitz et al. | |
| 6,108,300 A | 8/2000 | Coile et al. | |
| 6,138,126 A | 10/2000 | Hitz et al. | |
| 6,167,446 A | 12/2000 | Lister et al. | |
| 6,243,825 B1 | 6/2001 | Gamache et al. | |
| 6,247,057 B1 * | 6/2001 | Barrera, III | 709/229 |
| 6,289,356 B1 | 9/2001 | Hitz et al. | |
| 6,425,035 B2 | 7/2002 | Hoese et al. | |
| 6,434,627 B1 | 8/2002 | Millet et al. | |
| 6,453,426 B1 * | 9/2002 | Gamache et al. | 714/4 |
| 6,457,130 B2 | 9/2002 | Hitz et al. | |
| 6,609,213 B1 * | 8/2003 | Nguyen et al. | 714/4 |
| 6,625,750 B1 * | 9/2003 | Duso et al. | 714/4 |
| 6,665,304 B2 * | 12/2003 | Beck et al. | 370/401 |
| 6,732,186 B1 * | 5/2004 | Hebert | 709/239 |
| 2001/0011304 A1 | 8/2001 | Wesinger, Jr. et al. | |
| 2001/0052016 A1 * | 12/2001 | Skene et al. | 709/226 |
| 2002/0073354 A1 * | 6/2002 | Schroiff et al. | 714/4 |
| 2002/0120660 A1 * | 8/2002 | Hay et al. | 709/100 |
| 2002/0152310 A1 * | 10/2002 | Jain et al. | 709/226 |
| 2002/0152322 A1 * | 10/2002 | Hay | 709/245 |
| 2002/0188711 A1 * | 12/2002 | Meyer et al. | 709/223 |
| 2003/0191810 A1 * | 10/2003 | Muhlestein et al. | 709/215 |
| 2004/0133634 A1 * | 7/2004 | Luke et al. | 709/203 |

OTHER PUBLICATIONS

Fielding et al., "Hypertext Transfer Protocol—HTTP1.1", ©The Internet Society, Jun. 1999, pp. 1–143, http://www.i-etf.org/rfc/rfc2616.txt?number=2616.

IEEE Standards for Local and Metropolitan Area Networks: Virtual Bridged Local Area Networks, © IEEE, Std 802.1Q–1998, 1999, pp. 1–199.

Glaude, D., [LARTC] Vertual Server with Separate/Multiple Default Gateway/Routing, Nov. 9, 2001, pp. 1–3.

Rekhter, Y. et al., "RFC 1918 Address Allocation for Private Internets", Best Current Practice, Feb. 1996, pp. 1–9.

SNIA CIFS Documentation Work Group, "Common Internet File System (CIFS)", Version: CIFS–Spec 0.9, SNIA Storage Networking Industry Association, Mar. 2001, pp. 1–118.

European Search Report; EP 02 25 8871; Oct. 16, 2003, pp. 1–2.

* cited by examiner

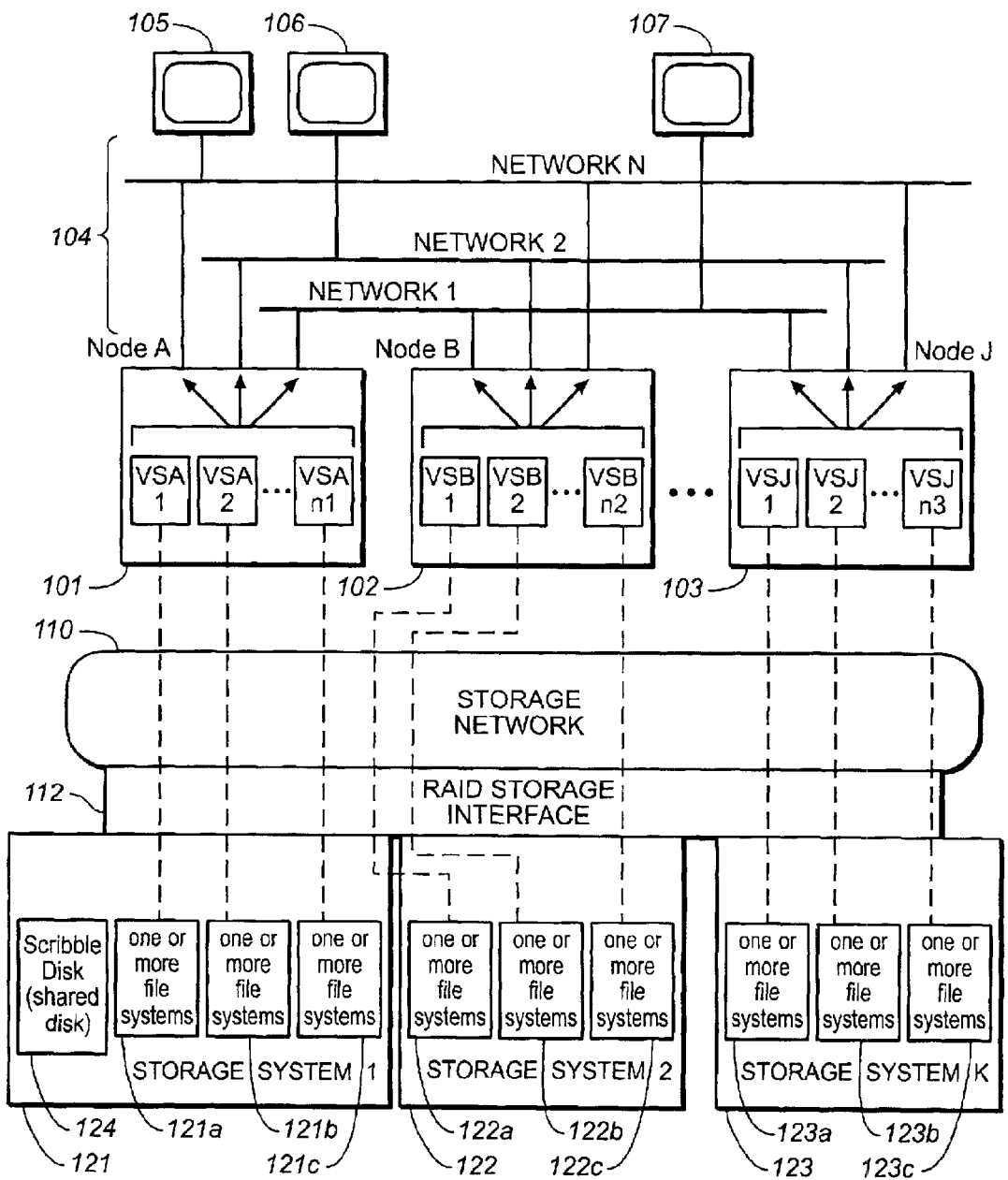
FIG._1

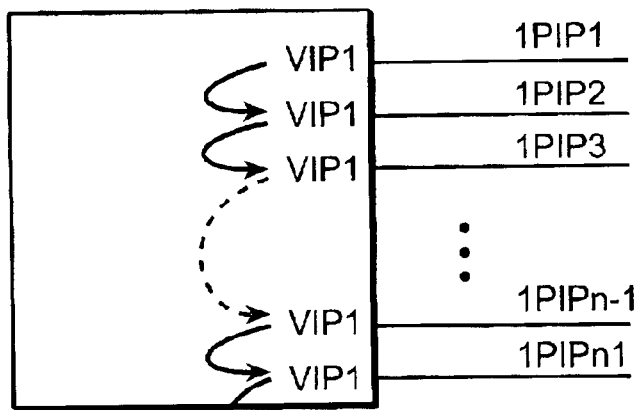
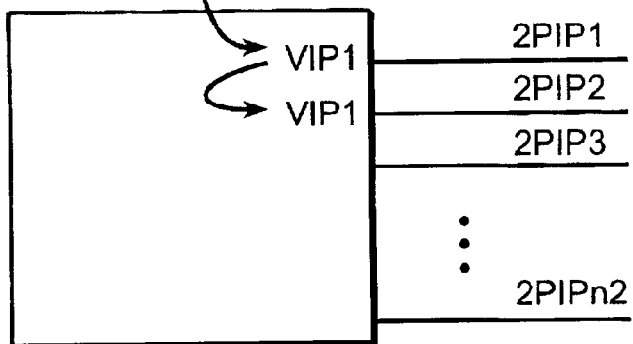
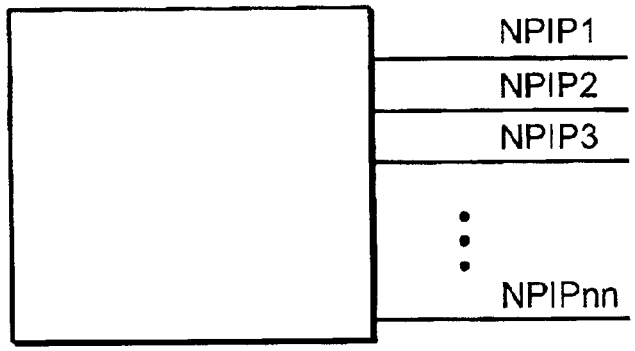
FIG._2

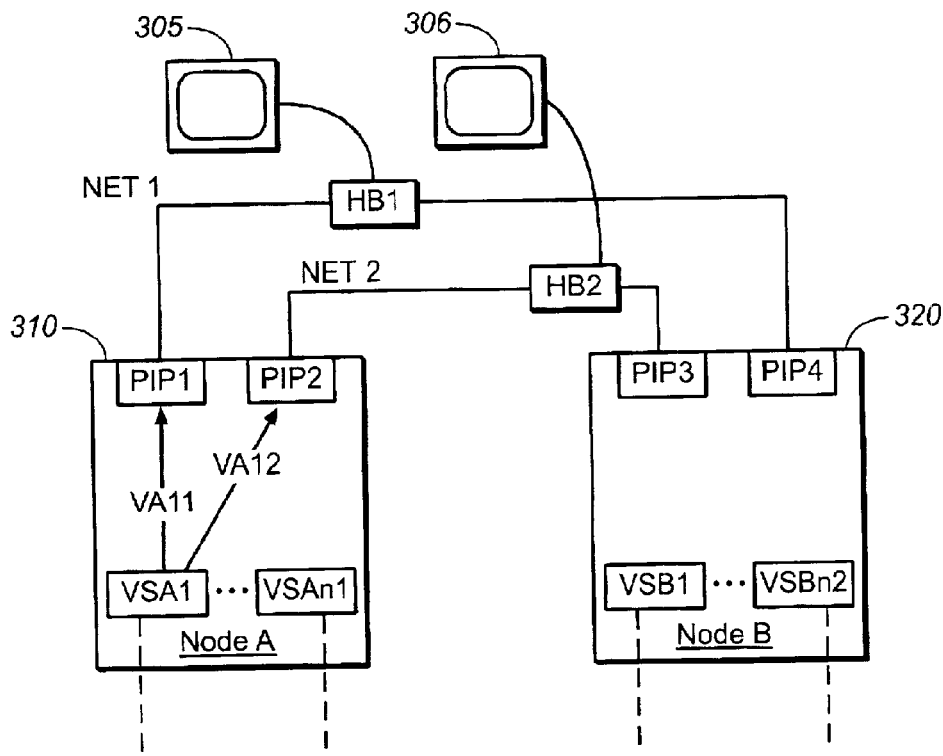
*FIG._3*
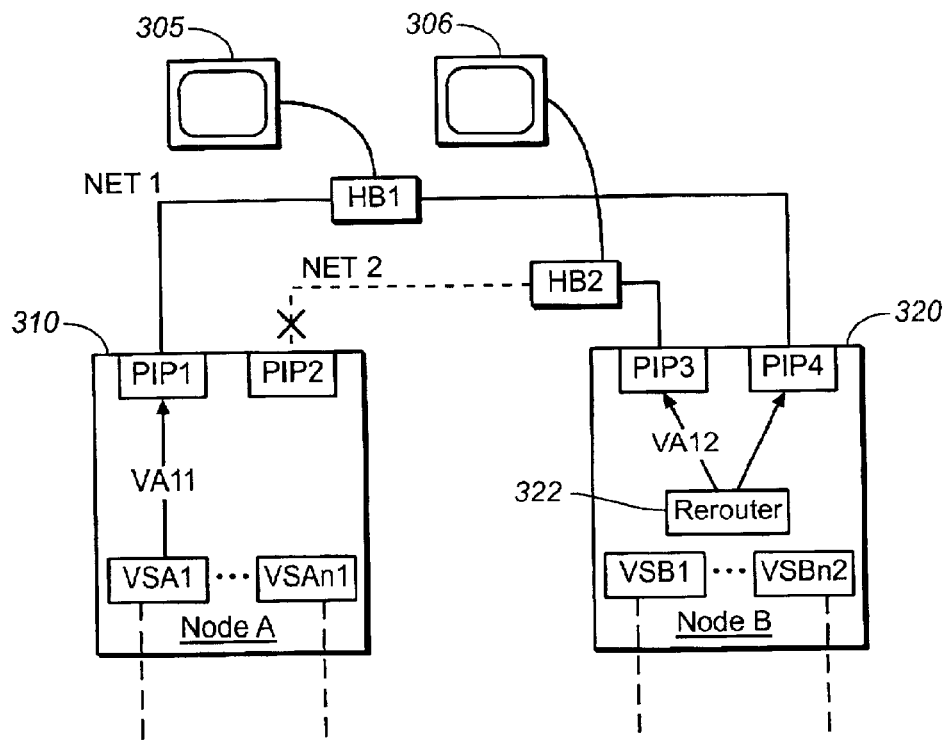
*FIG._4*

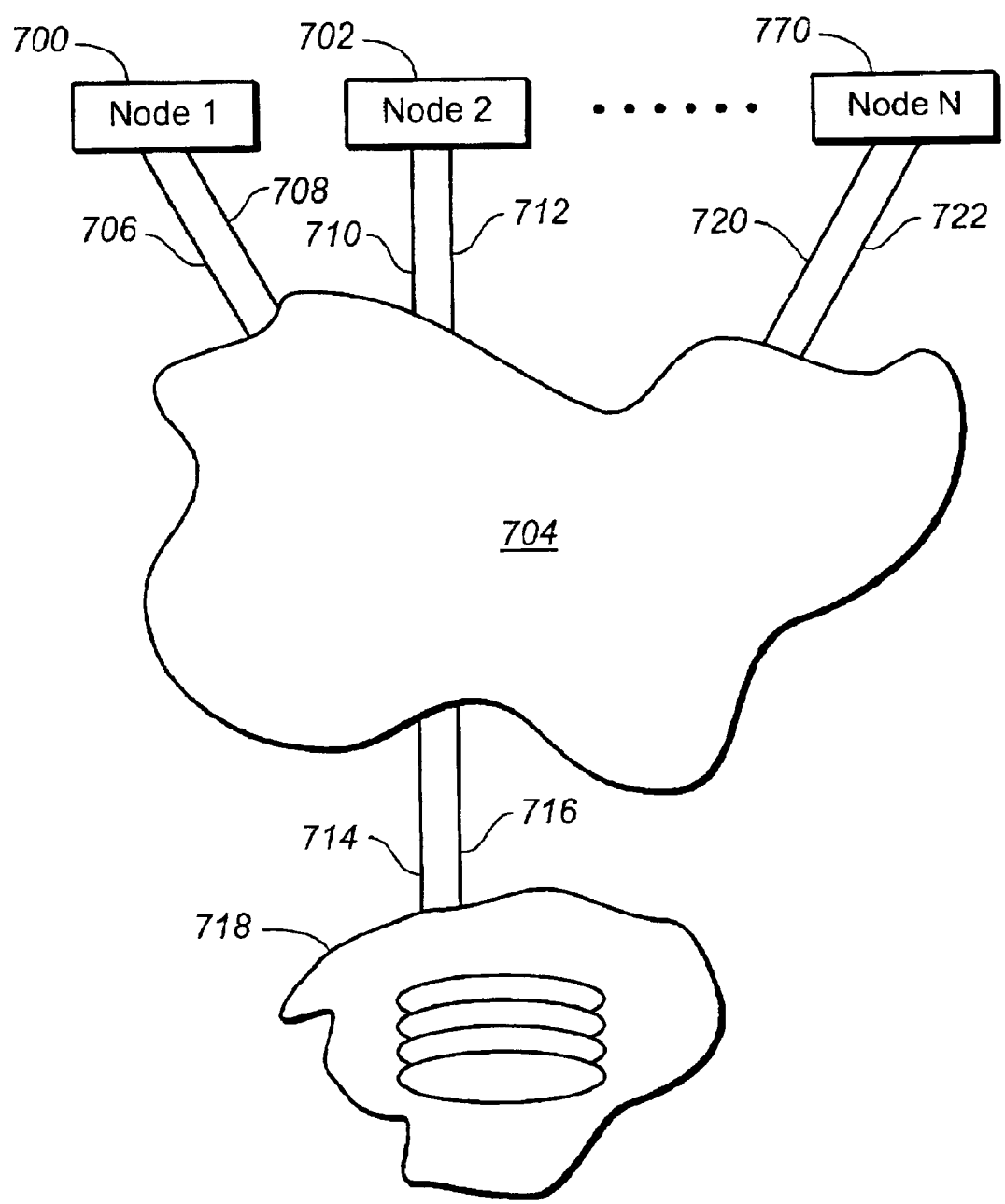
FIG._5

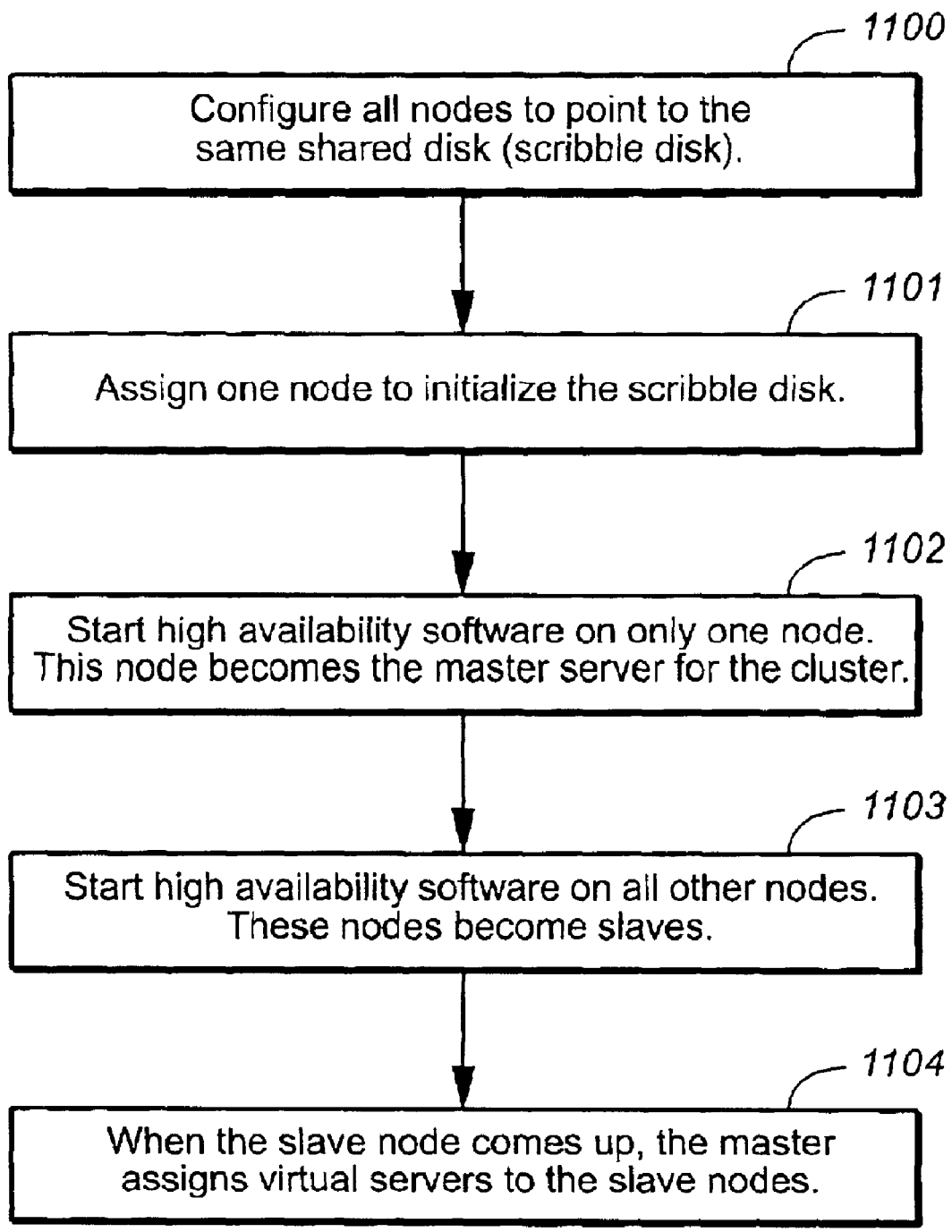
FIG._6

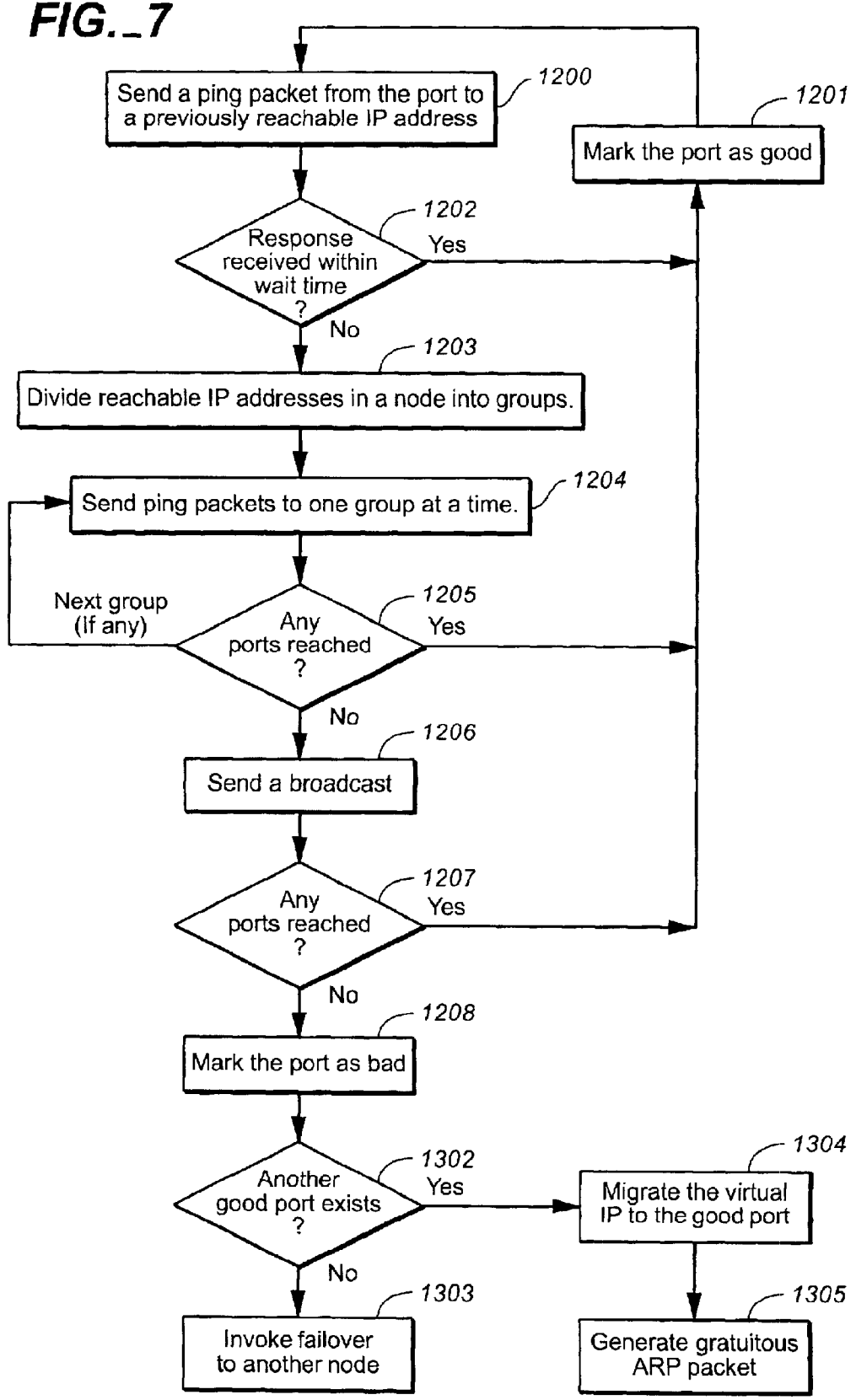
FIG._7

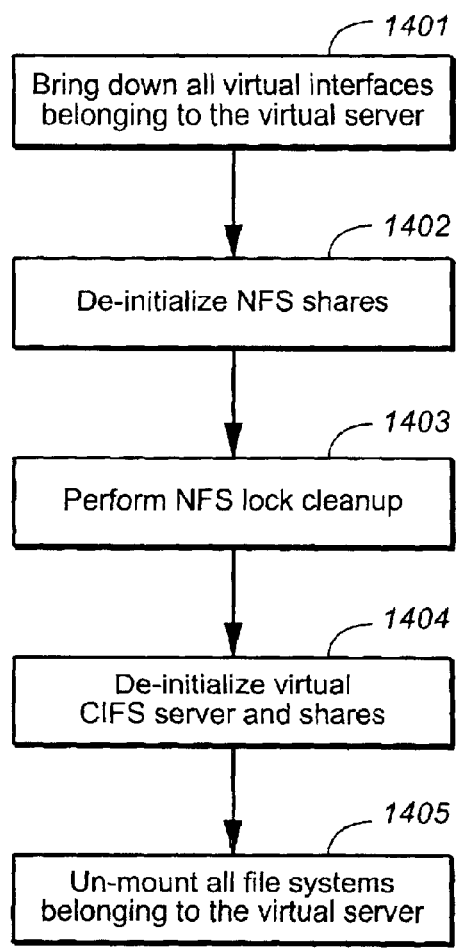
FIG._8
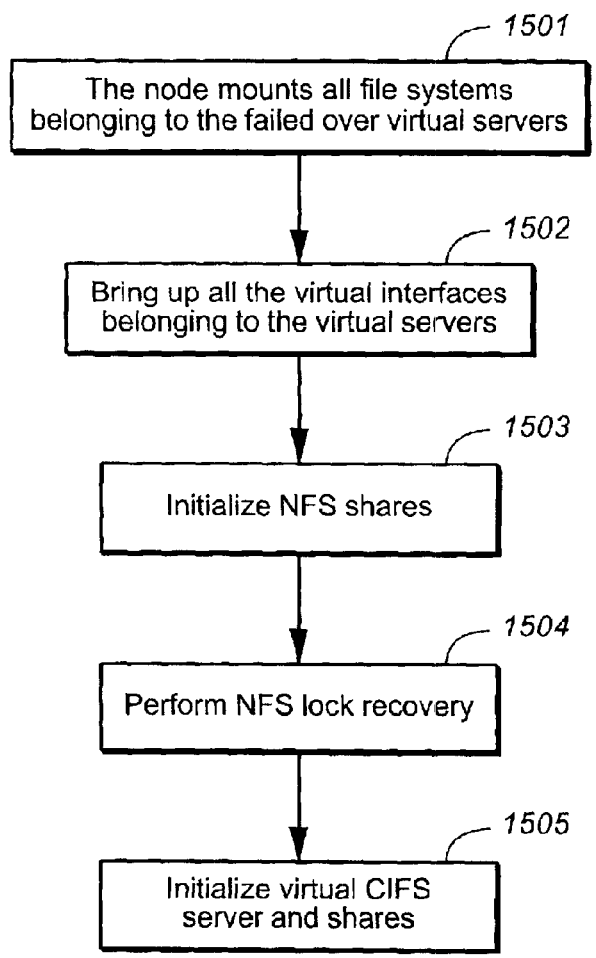
FIG._9

HIGH-AVAILABILITY CLUSTER VIRTUAL SERVER SYSTEM

BACKGROUND OF THE INVENTION

The invention relates to high-availability file server systems, which are colloquially referred to as file servers.

High-availability server systems are systems that continue functioning even after a failure of system hardware or software. The usual way of providing high availability is to duplicate system components. If some component becomes unavailable, another can be used instead. Robust, high-availability systems have no single point of failure. A single point of failure is a component whose failure renders the system unavailable. High-availability file server systems generally consist of a cluster of two or more servers (nodes). The nodes of a cluster have network connections between themselves and clients, and each node is connected, directly or indirectly, to one or more disk storage units.

A high-availability implementation can be based on a shared-disk model or a non-shared-disk model. In the shared-disk model, data is simultaneously shared by cluster nodes and a lock manager is used for access control. In the non-shared-disk model, access to data is shared; but at any point in time, each disk volume is permanently owned by one of the nodes. The shared-disk model is the approach most commonly used. When disks are not shared, data has to be replicated between two sets of unshared disks which adds some risk and complexity.

Nodes in a high-availability system typically consist of one or more instruction processors (generally referred to as CPUs), disks, memory, power supplies, motherboards, expansion slots, and interface boards. In a master-slave design, one node of the system cluster is called the primary or master server and the others are called the secondary, takeover, or slave servers. The primary and secondary nodes have similar hardware, run the same operating system, have the same patches installed, support the same binary executables, and have identical or very similar configuration. The primary and secondary nodes are connected to the same networks, through which they communicate with each other and with clients. Both kinds of nodes run compatible versions of failover software. In some configurations, in addition to shared disks, each node has its own private disks. Private disks typically contain the boot information, the operating system, networking software and the failover software. In some implementations the private disks are mirrored, or a redundant disk is provided.

The nodes of the system continuously monitor each other so that each node knows the state of the other. This monitoring can be done using a communication link called a heartbeat network. Heartbeat networks can be implemented over any reliable connection. In many implementations heartbeat is based on an Ethernet connection. A heartbeat network can also be implemented using something like a serial line running a serial protocol such as PPP (Point-to-Point Protocol) or SLIP (Serial Line Internet Protocol). Heartbeat can also be provided through shared disks, where a disk, or disk slice, is be dedicated to the exchange of disk-based heartbeats. A server learns about a failure in a heartbeat partner when the heartbeat stops. To avoid single points of failure, more than one heartbeat network can be implemented. Some implementations run the heartbeat on a private network (i.e., a network used only for heartbeat communications); others, on a public network. When a heartbeat stops, failover software running on a surviving node can cause automatic failover to occur transparently.

After failover, the healthy node has access to the same data as the failed node had and can provide the same services. This is achieved by making the healthy node assume the same network identity as the failed node and granting the healthy node access to the data in the shared disks while locking out the failed node.

NICs (Network Interface Cards) fail from time to time. Some high-availability systems have redundant network connectivity by providing backup NICs. NICs can have one or more network ports. In the event of a network port failure, the network services provided by the failed network port are migrated to a backup port. In this situation, there is no need for failover to another node. Redundant network connectivity can be provided for both public and private heartbeat networks.

Some high-availability systems support virtual network interfaces, where more than one IP (Internet Protocol) address is assigned to the same physical port. Services are associated with network identities (virtual network interfaces) and file systems (storage). The hardware in a node (physical server) provides the computing resources needed for networking and the file system. The virtual IP address does not connect a client with a particular physical server; it connects the client with a particular service running on a particular physical server. Disks and storage devices are not associated with a particular physical server. They are associated with the file system. When there is a failure in a node, the virtual network interfaces and the file system are migrated to a healthy node. Because these services are not associated with the physical server, the client can be indifferent as to which physical server is providing the services. Gratuitous ARP (Address Resolution Protocol) packets are generated when setting a virtual IP address or moving a virtual IP address from one physical port to another. This enables clients, hubs, and switches to update in their cache the MAC (Media Access Control) address that corresponds to the location of the virtual IP address.

All failovers cause some client disruption. In some cases, after failover is completed, the system has less performance than before failover. This can occur when a healthy node takes the responsibility of providing services rendered by the failed node in addition to its own services.

SUMMARY OF THE INVENTION

In general, in one aspect, the invention provides high-availability cluster server systems having a cluster of two or more autonomous servers, called nodes or physical servers, connected to storage devices, and computer program products and methods for operating such systems. One of the nodes is the master and the rest are the slaves. Each node runs one or more virtual servers. A virtual server consists of network resources and file systems. When one of the nodes fails, its virtual servers are transparently transferred to one or more other nodes. This is achieved by providing two sets of seamless connectivities. The first set is between the nodes and the clients. The second is between the nodes and the storage systems. The first connectivity is based on virtual IP technology between clients and the nodes. The second connectivity, the backend connectivity, can be implemented using Fibre Channel, SCSI (Small Computer System Interface), iSCSI (Small Computer Systems Interface over IP), InfiniBand™ Architecture, or any other such technologies, or using a combination of them.

Nodes communicate with each other through a heartbeat network to determine the health of each other. The heartbeat can operate over an IP or a SAN (Storage Area Network) infrastructure, or over both, to determine the availability of nodes. If one of the nodes or one of its components fails so that a virtual server running in that node goes down, failover occurs.

In a failover, the virtual sever of the failed node is migrated to another node. Under certain failure conditions, the seamless connectivities and redundant hardware and software components allow access to the file system to be maintained without invocation of the failover process. Virtual servers can be assigned priorities and higher priority virtual servers can be brought up before lower priority ones following failover. Load balancing can be provided by distributing virtual servers from a failed node to multiple different nodes.

In general, in another aspect, the invention provides systems, programs, and methods where more than one virtual server resides on a single physical server. Each virtual server exclusively owns one or more file systems and one or more virtual IP addresses, and it cannot see resources that are exclusively owned by other virtual servers. Virtual servers are managed as separate entities and they share physical resources on a physical server.

In general, in another aspect, the invention provides systems, programs, and methods where services that are not important can optionally not be migrated from a failed node. Setting priorities of virtual servers and preventing migration of less important virtual servers can be done by administrator configuration.

In general, in another aspect, the invention provides systems, programs, and methods where the loading of nodes is monitored so as to identify nodes that are less loaded than others. This information is used to perform load balancing. After failover, virtual servers are migrated to nodes that are less loaded in preference to nodes that are more heavily loaded. Because nodes can support multiple virtual servers, load balancing can be performed in this way during normal operation as well, even in the absence of a failure.

In general, in another aspect, the invention provides systems, programs, and methods where, to minimize occurrence of failover, each node has multiple network ports within a single subnet or within different subnets. (A subnet is a portion of a network that shares a common address component by providing the IP address with the same prefix.) If one of the ports fails, services are moved to one of the surviving ports. This allows multiple network port failures to occur without invocation of failover, so that failover occurs only when there is no surviving port.

Implementations of the invention can realize one or more of the following advantages. Failover used only as a last resort, and consequently the disruption caused by failover to the accessibility of services is limited. Total system performance is improved through load balancing. Total system performance is improved through the optional elimination of low priority services when a failure occurs.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 1 is a black diagram of a high-availability server system according to one aspect of the present invention.

FIG. 2 is a diagram illustrating how network failover is used prior to virtual server failover.

FIG. 3 is an embodiment of the invention based on network failthrough before virtual server failover.

FIG. 4 is the same embodiment illustrated in FIG. 3 after failover.

FIG. 5 illustrates a storage infrastructure for a high-availability server cluster.

FIG. 6 is a flowchart illustrating initialization of a high-availability server cluster.

FIG. 7 is a flowchart illustrating network port failure recovery.

FIG. 8 is a flowchart illustrating bringing down of a virtual server.

FIG. 9 is a flowchart illustrating bringing up a virtual server.

Like reference symbols in the various drawings indicate like elements.

DETAILED DESCRIPTION

FIG. 1 illustrates the components of a high-availability server in accordance with the invention. The server has a cluster of nodes, Node A 101, Node B 102, ..., Node J 103. Each node has one or more virtual servers. Node A has n1 virtual servers labeled VSA1, VSA2, ... VSAn1. Node B has n2 virtual servers labeled VSB1 VSB2, ... VSBn2. Node J has n3 virtual servers labeled VSJ1, VSJ2, ..., and VSJn3. Each node is connected to one or more storage systems over a storage network 110. The server has some number of storage systems 121, 122, 123. As shown in FIG. 1, each virtual server owns one or more file systems 121a, 121b, 121c, 122a, 122b, 122c, 123a, 123b, 123c. There is a shared disk 124 that is accessible to all the nodes. This shared disk is called the scribble disk; it contains status and configuration data. The storage network 110 can be Fibre Channel, SCSI, iSCSI, InfiniBand or any other such technologies. Clients 105, 106 and 107 are connected to the nodes through one or more networks 104 such as Network 1, Network 2, ... Network N. Each node has at least one physical port, and more than one virtual address can reside on the same physical port. The RAID storage interface 112 provides logical volume support to all the nodes. Each logical volume can be made up of multiple disks—for example, in RAID 0, 1, 5, 1+0, or 5+0 configurations.

Virtual servers own file systems and virtual IP addresses exclusively of other virtual servers. They share the other physical resources on a physical server. Virtual servers cannot see resources that are exclusively owned by other virtual servers, and they are managed as separate entities. Using virtual servers to group resources (virtual IP addresses and file systems) facilitates moving resources during failover and is more efficient than handling each resource individually.

Each node can have multiple network ports, also called physical IP ports (PIPs). If one port fails, the node will recover as long as there are healthy network ports on the node. Failure of the last port on a node causes failover to a healthy node.

A node in the cluster can act as either a master or a slave. There is only one master, the rest of the nodes are slaves (or, being in a state of transition, for example, be neither). The master coordinates the activities of the slaves. The slaves report the resources they control to the master. The slave servers are only aware of their own resources and state. The master maintains state information for the entire cluster. It also maintain information about the loading of the servers, which is used during load balancing, in which the system attempts to divide its work more or less evenly among the healthy nodes.

During normal operation each node measures its CPU usage and its total number of IOPS ("I/O operations per second"). The number of IOPS indicates the total load on the node when accessed by clients. This information is communicated to the master by way of the shared disk or network. When the CPU usage and/or the number of IOPS on a particular node exceeds a threshold, the master will examine the loading of other nodes.

If there are nodes in the system that can handle more work, the master will migrate some of the virtual servers to them. The objective is to divide the work more or less evenly among the healthy nodes. The threshold for CPU and/or IOPS loads at which load balancing is triggered is a configurable parameter that can be controlled through an administration interface to the system.

Within the same node, load balancing across the network ports can optionally be performed by redistributing virtual interfaces among healthy network ports. Software in the node monitors the load on the physical ports of the node. If one port is handling substantially more network traffic than other ports, some of its virtual interfaces are moved to ports that are less busy. The selection of which virtual interface or interfaces to move can be based on how much traffic each of the virtual interfaces is carrying.

In the cluster, the resources are monitored by a heartbeat protocol that operates over the network connection between nodes and over the shared disk to determine the availability of each server. A node knows about the failure of another node when it stops receiving heartbeat messages. Heartbeat over the network connection is based on the master probing the slaves using pings and/or RPC (Remote Procedure Call) calls. Pings can be implemented on either private or public networks. Heartbeat based on RPC can be sent using public networks.

If the master does not receive a response from a slave within a specified time (e.g., 3 sec), then the slave cannot be reached or there may be other problems with the slave. If the master stops sending pings or RPC, the slaves assume that the master could not be reached or that there may be other problems with the master. When one of the surviving nodes in the cluster determines that there are connectivity or other problems with one of the nodes, the surviving node must still determine whether the other node is really dead or is simply unreachable.

After heartbeat through ping and/or RPC detects node failure, heartbeat through shared disk is used to find out whether the failed node is really dead or just unreachable. If the dead node is the master, one of the slaves becomes the new master. To handle the possibility of a loss of all network connections, heartbeat through a shared disk (scribble disk) is implemented. Nodes exchange information about their status by scribbling, in other words, by writing to, and reading the scribble disk. The scribbling period for masters and slaves changes with the state of the cluster. During normal operation the master scribbles slowly, e.g., at the rate of one scribble per 60 second. When the master loses a slave it scribbles faster, e.g., at the rate of one scribble every 3 seconds. A slave that is controlled by a master does not scribble. A slave that recently lost a master scribbles quickly, e.g., at the rate of one scribble every 3 seconds. A node that is neither a master nor a slave scribbles slowly, e.g., at the rate of once every 60 seconds.

FIG. 2 illustrates how one implementation deals with network failure. If a node has multiple network ports and if one of the ports fails, the node recovers without failover. FIG. 2 shows Node 1, Node 2 . . . , Node N. Node 1 has n1 network ports labeled 1PIP1, 1PIP2, 1PIP3, . . . , 1PIPn-1, 1PIPn1. Node 2 has n2 network ports labeled 2PIP1, 2PIP2, 2PIP3, . . . , 2PIPn2. Node N, has nn ports labeled NPIPl, NPIP2, NPIP3, . . . , NPIPnn. As an example, assume that node 1 has a virtual IP address, VIP1, that is attached to a virtual server. When port 1PIP1 fails, VIP1 is moved to 1PIP2, as shown by the arrow. This will not cause failover because it is within the same Node 1. The same happens when 1PIP2, 1PIP3, . . . 1PIPn-1 fail. However, when 1PIPn1 fails, after all the other PIPs on Node 1 have failed, and failover occurs and VIP1 is moved to 2PIP1 in Node 2. The same happens for other nodes; that is, a virtual IP address moves to another physical port within the same node and failover occurs only when all the physical ports in the current node fail. Within a node or otherwise, a virtual IP address can be moved to a port within the same subnet as the failed port or to a port in a different subnet. In one implementation, a port within the same subnet will be selected in preference to a port in a different subnet.

In the preceding example, the virtual server was described as having only one virtual IP address. However, a single virtual server can be attached to more than one virtual IP address, and a node can have many physical and virtual IP addresses.

FIG. 3 and FIG. 4 illustrate another technique for moving virtual network interfaces without forcing failover. The diagrams show two nodes running two sets of virtual servers: VSA1, . . . , VSAn1 and VSB1, . . . , VSBn2. In FIG. 3, two virtual IP addresses, VA11 and VA12, are attached to the virtual server VSA1. To simplify the diagram, virtual IP addresses attached to the other virtual servers are not shown. Net1 and Net2 are different subnets. Client 305 is a client connected to Net 1 and client 306 is a client connected to Net 2. HB1 and HB2 are network hubs or switches. Client 306 communicates with the virtual servers in Node A over Net2.

FIG. 4 shows what happens when communication over Net2 fails. Virtual IP address VA12 is migrated from Node A 310 to the physical port PIP3 in Node B 320. Network failthrough is used rather than virtual server failover, because it is less disruptive to clients. As mentioned earlier, gratuitous ARP packets are generated whenever a virtual IP address is attached to a physical interface and when a virtual address is migrated to another interface.

As shown in FIG. 4, after the failure of Net2, data from client 306 is received by Node B through PIP3, to which VA12 has been migrated. Routing software 322 in Node B forwards the data to Node A by way of PIP4. Data from Node A is forwarded through PIPI to client 306 by way of PIP4 and PIP3 in Node B.

In one implementation that supports NFS file systems, NFS file locks are stored in the shared disk. Each virtual server owns the corresponding NFS file locks. During failover, ownership of the locks follows the virtual servers. Thus, the virtual servers and the corresponding NFS locks are migrated to a healthy node. As a consequence there is no need for the clients to manage NFS locks.

FIG. 5 elaborates the underlying storage infrastructure upon which a cluster is built. Nodes 700, 702, . . . , and 770 are the nodes of a cluster. These nodes can deploy bus adapters, of appropriate protocol, to connect to a shared storage bus or fabric 704, such as a SCSI, Fibre Channel Arbitrated Loop, Fibre Channel fabric, InfiniBand, iSCST, or other suitable bus or fabric. Multiple links 706 and 708, 710 and 712, 720 and 722 connect each node to the shared bus or fabric 704. Such multiple links enable the system to tolerate one link failure. Further links can be provided.

Shared storage units (multiple storage systems) 718 can be one or more fault tolerant shared storage units (such as RAID 5 or RAID 1 arrays) that are connected to the bus or fabric 704 by at least two links 714 and 716. This infrastructure will survive a single point of failure. Multiple failures could result in complete loss of access to the shared storage units 718.

In one advantageous implementation, dual Fibre Channel arbitrated loop host bus adapters in the cluster nodes connect to dual Fibre Channel arbitrated loops. This enables Fibre Channel targets such as FC-AL (Fibre Channel-Arbitrated Loop) RAID (Redundant Array of Independent Disks) boxes to be attached to the Fibre Channel arbitrated loop host. Shared storage units, such as RAID 5 (parity) or RAID 1 (mirror) arrays, are defined on the RAID box.

The shared storage units 718 are accessible from each cluster node but generally by different routes for the different nodes. Thus, it is advantageous to recognize each shared storage unit on each node with a cluster-wide name. This obviates difficulties in binding a device name to shared storage space when local device names are used, which are reflective of the route information, because routes to the same storage space could be different on different cluster nodes. To achieve this, a unique identifier associated with each shared storage unit 718 is used. A suitable identifier is the World Wide ID (WWID) of a FC RAID controller, upon which shared storage units 718 are defined. A globally-accessible name server database is used to associate a administrator-chosen name with the unique identifier of each shared storage unit. The database can be stored in any convenient, globally-accessible location, such as in the scribble disk or in a server outside the cluster but accessible to all cluster nodes. The name server is consulted by the cluster nodes after they have discovered the shared storage unit and have inquired about the shared storage unit's unique identifiers. By consulting the name server, the cluster nodes resolve the shared storage units (of which there can be, and generally are, more than one) to cluster-wide device names.

Because cluster nodes have multiple paths to the shared storage unit, it is advantageous to perform load balancing by alternating I/O (that is, input/output or data transfer) requests to the same shared storage unit, but by different routes. For example, cluster node 700 can load balance by alternating data transfer requests between links 706 and 708. This benefits the cluster node by increasing the overall bandwidth available to access the shared storage unit.

The design can be configured to survive a single or more points of failure. The robustness of the design depends three factors. The first is the number of links between each node and the shared storage bus or fabric 704. The second factor is the number of links between the shared storage bus or fabric 704 and the data storage units 718. With only two links between each pair of elements, as shown in FIG. 5, the design can tolerate a single point of failure. With multiple bus adapters in a cluster node, a bus adapter can fail and data transfer requests to the shared storage unit can continue at half bandwidth performance. Associated physical interfaces (such as cables) can also fail. Any single point failure of a cable is tolerated similarly. Single point of failure tolerance, due to the number of links being two, can be improved to better tolerance by increasing the number of links. The shared storage units are fault tolerant RAID arrays that can tolerate failure of a member drive. If multiple RAID controllers are used to control the same shared storage unit, then a failure of a RAID controller is tolerated.

Shared storage units are protected by node ownership locking to guarantee exclusive node usage. Each node is aware of the shared storage unit ownership of the other nodes. If it determines that a shared storage unit is owned by some other node, it marks the shared storage unit as unusable on that node.

Storage abstraction such as virtual storage technology allows nodes to span a virtual storage unit across multiple shared storage units. This improves fault tolerance as well as performance. Virtual storage devices are created on nodes using multiple shared storage units. These virtual storage devices are able to span across multiple shared storage units, controlled by different storage controllers, and support efficient data protection and data transfer performance features. The virtual storage devices can be concatenations, mirrors, or stripes of multiple shared storage units.

The advantage that a concatenation provides is expansion of capacity. When a shared storage unit is concatenated with another shared storage unit, the second shared storage unit is used when the first one is full.

With stripes of shared storage units, sequential I/O requests alternate among the various member shared storage units. Striped virtual storage devices provide expansion as well as performance. Because data transfer requests are distributed in parallel across different shared storage units, a node experiences higher throughput as compared to use of a single shared storage unit.

With a virtual storage mirror (RAID 1) of 2 different shared storage units, I/O operations are duplicated on each member shared storage unit. Read operations from a mirror are enhanced by reading from the member with a predetermined least seek time. Mirror synchronization is automatic when it is determined that a mirror was damaged and the damaged member was correctly replaced. A mirrored virtual storage device gives an extra layer of fault tolerance by tolerating the complete loss of a shared storage unit. By deploying mirrored virtual storage devices, the fault tolerance capability of the cluster is increased two-fold.

FIG. 6 illustrates the initialization of a high-availability system in accordance with the invention. In step 1100, all the nodes in the system cluster are configured to point to the same shared storage unit, which will be used as the scribble disk. In step 1101, one node is assigned to initialize the scribble disk. Initialization involves extracting data from a configuration file. In step 1102, the high-availability software is started in one of the nodes. This node becomes the master server for the cluster. In step 1103, the high-availability software is started on all other nodes. These nodes are the slaves in the cluster. In step 1104, the master assigns virtual servers to the slaves. This step can be done manually if desired.

FIG. 7 shows how a node with multiple network ports detects and handles network failure. It does this by testing each of its ports as will now be described. In step 1200, the node sends a ping packet at frequent intervals (such as every 3 seconds) to a previously reachable external port using the port being tested. The frequency of pinging is configurable. In decision step 1202, the node determines whether a response to the ping was received within a predetermined wait time (such as 250 msec (milliseconds)). The wait time is also configurable. If a response was received, the port being tested is marked as good in step 1201. Otherwise, in step 1203 the reachable external IP addresses known to the node are divided into groups. The total number of addresses in a group is configurable. In step 1204, ping messages are sent to the addresses in each group one group at a time. This is done, rather than using broadcast, because broadcast is more costly. In decision step 1205, the node determines if any address within the group was reached within a wait time. If one was, the port being tested is marked as good and execution continues at step 1201. If no address in all groups was reachable, execution continues at step 1206. In step 1206, a broadcast message is sent. In decision step 1207, if any response is received within a wait time, the port being tested is marked as good and execution continues at step 1201. Otherwise, the node concludes that the port being tested is bad, and the port is marked bad in step 1208.

In decision step 1302, the node determines whether there is a healthy network port in the node. If there is, in step 1304 the virtual address of the failed node is migrated to the healthy network port. Otherwise, in step 1303 failover is invoked to another node in the cluster.

The process of FIG. 7 is performed for each physical port that the node has marked as good.

The failure of a network port is only one of the possible reasons to invoke failover. Other events that can cause failover include hardware failure, power failure in one of the nodes or the storage systems, failure in the links between a node and the storage system, unrecoverable failures within the storage bus or fabric, and failure in the links between the shared storage units and the storage bus or fabric. Failover can also be initiated manually. After the problem which caused failover is rectified, a manual failback command can be executed to migrate the virtual servers to their original node.

For example, if a shared storage unit, which contains file systems, is not accessible for any reason from a node (e.g., due to a complete breakage of the connection between the node and the unit, such as the failure of links 706 and 708 with reference to node 700 in the specific configuration illustrated in FIG. 5), then the virtual server which contains the inaccessible file systems is migrated to another physical node that can access storage unit and therefore the file systems, if such an alternative node exists.

FIG. 8 shows the steps performed when a virtual server is shut down in a node prior to its migration to another node. In this example, the virtual server has both an NFS file system and a CIFS file system. In step 1401, all virtual interfaces belonging to the virtual server are brought down. In step 1402, any NFS shares are de-initialized. In step 1403, NFS lock cleanup is performed. In step 1404, virtual CIFS (Common Internet File System) server and shares are de-initialized. In step 1405, all file systems belonging to the virtual server are unmounted.

FIG. 9 illustrates the steps needed to bring up a virtual server. Again, in this example, the virtual server has both an NFS file system and a CIFS file system. In step 1501, the node mounts all file systems belonging to the failed virtual server. In step 1502, the virtual interfaces belonging to the virtual server are brought up. In step 1503, the NFS shares are initialized. In step 1504, NFS lock recovery is performed. In step 1505, the virtual CIFS server and shares are initialized.

The system can serve various file systems simultaneously. A file system may fail due to internal file system meta data inconsistency, sometimes referred to as file system degradation. In one implementation of the system, when degradation is detected—which is generally done by the file system itself—software in the nodes handles the repair of the file system without complete disruption to clients accessing the file system using the NFS protocol. In the event of file system degradation, access to the file system is temporarily blocked for NFS clients. The NFS protocol by its nature continues sending requests to a server. After blocking the file system for NFS access, the software prevents clients from accessing the file system and then repairs it (e.g., by running a utility such as fsck). After repairing the file system, the software makes it accessible again to clients. Then the NFS blocking is removed, so that NFS requests from clients can again be served. As a result, applications on clients may freeze for a while without failing, but resume once the file system comes back online.

Administrative configuration of the system can be done in any conventional way. For example, an application program running on a system node or on an independent personal computer can define and modify parameters used to control the configuration and operation of the system. In the implementation described above, such parameters are stored in a configuration file located on the scribble disk; however, the configuration data can be stored in any number of files, in a database, or otherwise, and provided to the system through any suitable means.

In certain aspects, the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, aspects of the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results.

What is claimed is:

1. A file server system, comprising:

two or more nodes, each node configured to run two or more virtual servers, each virtual server having as exclusive resources a virtual interface to clients and one or more file systems, wherein an exclusive resource of a virtual server can be seen by the virtual server and not by another virtual server, and wherein the virtual interface comprises two or more virtual IP addresses.

2. The system of claim 1, wherein the virtual interface comprises a virtual IP address.

3. The system of claim 1, wherein clients access the file systems using NFS or CIFS protocols.

4. The system of claim 1, further comprising failover computer program instructions operable to be executed to cause the system to:
   detect a failure of a first node; and
   migrate each virtual server on the first node to a different node in the system.

5. The system of claim 4, wherein each virtual server has an associated failover priority, and the failover instructions further comprise instructions to:
   migrate virtual servers in order of their respective priorities.

6. The system of claim 4, wherein the failover instructions further comprise instructions to:
   recognize a virtual server that is identified as not to be migrated in the event of node failure and prevent migration of a so-identified virtual servers when it is on a node that fails.

7. The system of claim 1, further comprising rerouting computer program instructions operable to be executed to cause the system to:
   detect a failure in a first subnet connected to a first node, the first node having a network connection to a first client;
   identify a second node having a network connection to the first client and a connection over a second, different subnet to the first node;
   use the second node as a router in response to the detected failure to route data between the first client and the first node.

8. The system of claim 7, wherein before failure in the first subnet, the connection between the first client and the first node is through a first virtual IP address assigned to a port on the first node, the rerouting instructions further comprising instructions to:
   migrate the first virtual IP address to a port on the second node connected to the second subnet.

9. The system of claim 1, further comprising failover computer program instructions operable to be executed to cause the system to:
   detect a failure of a physical port on a first node;
   determine whether any other physical port on the first node is good;
   migrate all virtual IP addresses associated with the failed physical port to a good physical port on the first node if there is such a good port; and
   migrate all virtual IP addresses associated with the failed physical port along with all virtual servers attached to such virtual IP addresses to a different, second node if there is no such good port on the first node.

10. The system of claim 9, wherein the failed physical port is on a first subnet and the good physical port is on a different, second subnet.

11. The system of claim 1, wherein the system comprises load-balancing computer program instructions operable to be executed to cause the system to:
   calculate a balanced distribution of the virtual server loads across the nodes of the system, excluding any failed nodes; and
   perform load balancing by migrating one or more virtal servers from heavily loaded nodes to less heavily loaded nodes.

12. The system of claim 1, further comprising computer program instructions operable to be executed on a first node to:
   determine a load on each physical port on the first node; and
   redistribute the virtual interfaces on the first node among the physical ports of the fist node for load balancing over the physical ports.

13. The system of claim 1, further comprising computer program instructions operable to be executed to cause the system to:
   detect an inability on a first node to access of shared storage unit; and
   in response to detection of the inability to access the shared storage unit, migrate all virtual servers containing file systems on the shared storage unit to an alternative node that can access the storage unit if such an alternative node exists in the system.

14. The system of claim 11, wherein the load-balancing instructions are further operable to determine a load on each virtual server.

15. The system of claim 11, wherein the load-balancing instructions are further operable to determine a load on each physical server.

16. The system of claim 11, wherein the nodes include a master node and the load-balancing instructions are operable to be executed on the master node.

17. The system of claim 11, wherein the load-balancing instructions are operable to migrate a first virtual server and a second virtual server from a first node, the first virtual server being migrated to a second node of the system and the second virtual server being migrated to a different, third node of the system.

18. The system of claim 11, wherein the load-balancing instructions are operable to balance system load as part of a failover process.

19. The system of claim 11, wherein the load-balancing instructions are operable to balance system load independent of any failover occurring.

20. The system of claim 1, further comprising computer program instructions operable to be executed to cause the system to:
   detect without user intervention a file system degradation of a fist file system; and
   block access to the first file system in response to the detection of the degradation, repair the first file system, and then permit access to the first file system, all without user intervention.

21. A file server system, comprising:
   a node configured with a virtual server, the virtual server having two or more simultaneously active virtual IP addresses, the virtual server having as exclusive resources one or more file systems, wherein an exclusive resource of a virtual server can be seen by the virtual server and not by another virtual server.

22. The system of claim 21, wherein the node is configured with a second virtual server having two or more other simultaneously active virtual IP addresses.

23. A file server system, comprising:
   two or more nodes, each node being configured to run a virtual server having as exclusive resources a virtual IP address and one or more file systems, wherein an exclusive resource of the virtual server can be seen by the virtual server and not by another virtual server, and each node being configured with two or more physical ports;
   wherein a first node is further configured to:
     detect a failure of a physical port on the first node;
     determine whether any other physical port on the first node is good;
     migrate all virtual IP addresses associated with the filed physical port to a good physical port on the first node if there is such a good port; and migrate all virtual IP addresses associated with the failed physical port along with all virtual servers attached to such virtual IP addresses to a different, second node if there is no such good port on the first node.

24. A computer program product, tangibly stored on a computer-readable medium, for execution in multiple nodes of a file server system cluster, comprising instructions operable to cause a programmable processor to:

detect a failure of a first node of the cluster, and migrate each of multiple virtual servers on the first node to a different node in the cluster each virtual server having as exclusive resources one or more file systems, wherein an exclusive resource of a virtual server can be seen by the virtual server and not by another virtual server.

25. The product of claim 24, further comprising instructions to:

migrate virtual servers in order of their respective priorities.

26. The product of claim 24, further comprising instructions to:

recognize a virtual server that is identified as not to be migrated in the event of node failure and prevent migration of a so-identified virtual server when it is on a node that fails.

27. The product of claim 24, comprising instructions to:

detect a failure in a first subnet connected to a first node, the first node having a network connection to a first client;

identify a second node having a network connection to the first client and a connection over a second, different subnet to the fist node;

use the second node as a router in response to the detected failure to route data between the first client and the first node.

28. The product of claim 24, further comprising instructions to:

detect a failure of a physical port on a first node of the cluster;

determine whether any other physical port on the first node is good;

migrate all virtual IP addresses associated with the failed physical port to a good physical port on the first node if there is such a good port; and migrate all virtual IP addresses associated with the failed physical port along with all virtual servers attached to such virtual IP addresses to a different, second node of the cluster if there is no such good port on the first node.

29. The product of claim 28, wherein before failure in the first subnet, the connection between the first client and the first node is through a first virtual IP address assigned to a port on the first node, the rerouting instructions further comprising instructions to:

migrate the first virtual IP address to a port on the second node connected to the second subnet.

30. The product of claim 24, further comprising load-balancing instructions to:

determine a load produced by each virtual server;

calculate a balanced distribution of the virtual server loads across the nodes of the server, excluding any failed nodes, and perform load balancing by migrating one or more virtual servers from heavily loaded nodes to less heavily loaded nodes.

31. The system of claim 30, when the nodes include a master node and the load-balancing instructions are operable to be executed on the master node.

32. The system of claim 30, wherein the load-balancing instructions are operable to migrate a first virtual server and a second virtual server from a first node, the first virtual server being migrated to a second node of the system and the second virtual server being migrated to a different, third node of the system.

33. A computer program product, tangibly stored on a computer-readable medium, for execution in a node of a file server system cluster, the product comprising instructions operable to cause a programmable processor to:

detect a failure of a physical port on a first node of the cluster, wherein one or more virtual IP addresses are associated with the physical port, at least one of the one or more of the virtual IP addresses being an exclusive resource to a virtual server that includes as exclusive resources one or more file systems, wherein an exclusive resource of a virtual server can be seen by the virtual server and not by another virtual server;

determine whether any other physical port on the first node is good;

migrate all virtual IP addresses associated with the failed physical port to a good physical port on the first node if there is such a good port; and migrate all virtual IP addresses associated with the failed physical port along with all virtual servers attached to such virtual IP addresses to a different, second node if there is no such good port on the first node.

34. A computer program product, tangibly stored on a computer-readable medium, for execution in a file server node in which one or more virtual servers each have one or more virtual IP addresses associated with physical ports, the product comprising instructions operable to cause a programmable processor to:

detect a failure of a physical port on a file server node, the node having two or more physical ports, the node having one or more virtual servers each having as exclusive resources one or more virtual IP addresses associated with physical ports and one or more file systems, wherein an exclusive resource of a virtual server can be seen by the virtual server and not by another virtual server;

identify one or more other physical ports on the file server node as being good; and migrate each virtual IP addresses associated with the failed physical port to a good physical port on the file server node.

35. The product of claim 34, further comprising instructions to:

determine a load on each physical port on the first node; and use the determined load for load balancing over the good physical ports when migrating the virtual IP addresses associated with the failed physical port to the good physical ports of the file server node.

36. The product of claim 34, wherein:

each physical port of the file server node is within a one of a plurality of subnets; and virtual IP addresses are migrated preferentially to good physical port that is in the same subnet as the failed physical port.

37. A file server node, comprising:

two or more physical ports;

the node being configured to run two or more virtual servers, each virtual server having as exclusive resources a virtual interface to clients and one or more file systems, each virtual interface comprising a virtual IP address, wherein an exclusive resource of a virtual server can be seen by the virtual server and not by another virtual server, the node being further configured to detect a failure of a first physical port, determine which other physical port or ports of the node is healthy, and to migrate all virtual IP addresses associated with the failed first physical port to a good physical port of the first node.

38. The file server node of claim 37, further configured to:

determine a load on each physical port; and use the determined load for load balancing over the good physical ports when migrating the virtual IP addresses associated with the failed physical port to the good physical ports of the node.

39. The file server node of claim 37, wherein:

each physical port of the file server node is within a one of a plurality of subnets; and virtual IP addresses are migrated preferentially to a good physical port that is in the same subnet as the failed physical port.

* * * * *

UNITED STATES PATENT AND TRADEMARK OFFICE
CERTIFICATE OF CORRECTION

PATENT NO. : 6,944,785 B2
DATED : September 13, 2005
INVENTOR(S) : Ananda R. Vayyala et al.

It is certified that error appears in the above-identified patent and that said Letters Patent is hereby corrected as shown below:

Column 11,
Line 60, replace "virtal" with -- virtual --.

Column 12,
Lines 2 and 38, replace "fist" with -- first --.
Line 65, replace "filed" with -- failed --.

Column 13,
Line 28, replace "The product of claim 24, comprising instructions to:" with -- The product of claim 24, further comprising instructions to: --.
Line 34, replace "fist" with -- first --.

Column 14,
Line 1, replace "when" with -- wherein --.

Column 15,
Line 9, replace "server," with -- server; --.

Signed and Sealed this

Seventh Day of March, 2006

JON W. DUDAS
*Director of the United States Patent and Trademark Office*